United States Patent [19]

Shepherd

[11] 3,876,761

[45] Apr. 8, 1975

[54] SOIL FUMIGANT GEL EMPLOYING CERTAIN POLYMERS

[75] Inventor: Thomas H. Shepherd, Hopewell, N.J.

[73] Assignee: National Patent Development Corporation, New York, N.Y.

[22] Filed: May 21, 1969

[21] Appl. No.: 826,689

[52] U.S. Cl. .............. 424/78; 424/81; 424/83; 424/350; 260/31.4 R; 260/34.2; 71/126; 71/DIG. 1

[51] Int. Cl. .............................................. A01n 9/30

[58] Field of Search ............... 424/78, 81, 83, 350; 252/316; 260/94.9 G, 80.73, 33.8 U; 167/42 R

[56] References Cited
UNITED STATES PATENTS

| | | | |
|---|---|---|---|
| 2,441,553 | 5/1948 | Britton | 167/39 |
| 2,656,334 | 10/1953 | D'Alelio | 260/47 |
| 2,916,855 | 12/1959 | Thiegs | 47/58 |
| 2,988,479 | 6/1961 | Youngston et al. | 167/39 |
| 3,055,799 | 9/1962 | Youngson et al. | 167/22 |
| 3,248,288 | 4/1966 | Wilder et al. | 167/42 |
| 3,269,994 | 8/1966 | Horn et al. | 260/86.1 |
| 3,520,949 | 7/1970 | Shepherd et al. | 260/857 |

Primary Examiner—Vincent D. Turner
Attorney, Agent, or Firm—Cushman, Darby & Cushman

[57] ABSTRACT

A gel is made of a liquid soil fumigant and a polymer having the proper hydrophilic-hydrophobic balance or having the proper crystalline non-crystalline mixture.

9 Claims, No Drawings

SOIL FUMIGANT GEL EMPLOYING CERTAIN POLYMERS

The present invention relates to the gelation of soil fumigants.

Soil fumigants are normally volatile liquids and hence are not normally retained in the soil for long periods of time. It is an object of the present invention to prolong the release of the fumigant. Furthermore, it is an object of the invention to apply the fumigants in solid form so that there is more ready control of dosage and ability to spread by fertilizer type apparatus.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description It has now been found that normally volatile soil fumigants can be converted to solid gels and applied in this fashion to the soil to control nematodes, borers, worms, insect larvae, weeds, etc.

The preferred soil fumigants are ethylene dibromide and methyl bromide. There can also be employed propargyl bromide, ethylene dichloride, 1,2-dibromo-3-chloropropane, 1-chloropropene, 2-chloropropene, 1,2-dichloropropene, 1,2-dichlorobutene-1, 1,2-dibromobutane, 1,3-dibromobutane, 1-bromobutene, 2-bromobutene, 1-bromobutane, 2-bromobutane, trichloroethylene or mixtures e.g., 2 parts of 1,3-dichloropropene with 1 part of 1,2-dichloropropane.

The gelation is accomplished by employing either (1) a polymer having a balance of hydrophilic and hydrophobic groups such that the hydrophobic portion of the polymer is present in sufficient quantity to maintain the polymer in a homogeneously dispersed condition throughout the fumigant and the hydrophilic groups, capable of hydrogen bonding, are substantially insoluble at ambient temperature and below (35° C. and below, usually below 30° C.) and effect physical interchain attraction sufficient to cause gel formation. Ambient temperature can also be considered as soil temperature.

The polymer may be a copolymer of ethylene, styrene, an alkyl acrylate, an alkyl methacrylate, or vinyl acetate with up to 50 percent of a hydrophilic group containing monomer.

Examples of this type of material include (a) ethylene-vinyl alcohol copolymers containing 14 to 25 mole percent vinyl alcohol. Above 25 mole percent vinyl alcohol the copolymer becomes substantially insoluble; (b) styrene copolymers with from 10 to 50 weight percent of a hydrophilic monomer such as acrylamide, methacrylamide, hydroxyethyl acrylate, hydroxyethyl methacrylate, hydroxypropyl acrylate, hydroxypropyl methacrylate, diethylene glycol monoacrylate, diethylene glycol monomethacrylate, dipropylene glycol monoacrylate, dipropylene glycol monomethacrylate, dihydroxyethyl itaconate, monohydroxyethyl itaconate, monohydroxyethyl citraconate, dihydroxyethyl fumarate, dihydroxypropyl maleate, "vinyl alcohol" (made by hydrolysis of a copolymer of styrene and vinyl acetate), (c) butyl acrylate copolymers with 15 to 50 percent of any of the above hydrophilic monomers, e.g., hydroxyethyl methacrylate, other alkyl acrylates can be used in place of butyl acrylate, e.g. ethyl acrylate, methyl acrylate or 2-ethylhexyl acrylate; (d) methyl methacrylate copolymers with 15 to 50 percent of any of the above hydrophilic monomers, e.g., hydroxyethyl acrylate or hydroxyethyl methacrylate; (e) vinyl acetate copolymers with 10–40 percent of any of the above-mentioned hydrophilic monomers, e.g., hydroxyethyl methacrylate. Of course the precise amount of hydrophilic monomer to employ will depend on the monomer itself and the soil fumigant employed. However, a very simple test will show the suitability for any particular polymer or copolymer with any soil fumigant, namely heat the polymer and liquid fumigant to form a solution and then cool to see if a gel is formed.

2. Partially crystalline homopolymers and copolymers of alpha olefins such as ethylene, propylene, butene-1, pentene-1 and hexene-1 in which the non-crystalline or non-crystallizable portions of the molecule are sufficiently "soluble" in the fumigant species to maintain the polymer dispersed throughout the liquid, and the crystallizable portions of the polymer chain associate to form a network producing a gel structure.

Examples of this type include low density polyethylene, ethylene copolymers with 0.1–20 mole percent of other monomers which tend to reduce crystallinity such as vinyl acetate, vinyl butyrate, acrylic acid, methacrylic acid, ethyl acrylate, methyl acrylate, 2-ethylhexyl acrylate, methyl methacrylate, ethyl methacrylate, butyl methacrylate, propylene, butene-1, etc. If the amount of comonomer used with ethylene exceeds about 20 mole percent in general the resulting crystallinity is too low to effect gel network formation in solution. The density of paraffinic hydrocarbon polymers such as ethylene and copolymer of ethylene with minor quantities of other materials such as propylene and butene-1 should have a density of 0.890 to 0.925. There can even be used mixtures of microcrystalline and amorphous hydrocarbon waxes.

With low density (0.916) polyethylene, the maximum amount of ethylene dibromide that can be incorporated in the gel is about 90 percent. If a copolymer of ethylene with a minor quantity, e.g., 10 mole percent of propylene is used, the maximum quantity of ethylene dibromide increased to about 95 percent. With a 0.916 density polyethylene if one tries to use less than 10 percent of polymer phase separation into a gel phase and a liquid phase occurs with the gel phase containing about 10 percent polymer and the liquid phase containing essentially no polymer.

Other suitable materials include isotactic poly-n-butene-1 and crystalline copolymers of propylene with 10-30 mole percent of monomers such as ethylene and $C_4$-$C_{16}$ alpha olefins e.g., butene-1, amylene-1, hexene-1, decene-1 and hexadecene-1.

The gels are formed by heating the mixture of soil fumigant and polymer to about 100° C. or higher to obtain dissolution and then gelation is obtained merely on cooling to ambient temperature. If necessary, superatmospheric pressure can be employed to maintain the fumigant liquid during the heating.

Low density polyethylene has been found to be particularly valuable in forming satisfactory, inexpensive gels with ethylene dibromide.

For economical reasons as little polymer as possible is employed in making the gel. Usually this is 5 to 10 percent by weight of the total of polymer and soil fumigant. However, the polymer can be as much as 50 percent or even more of the total gel composition.

As a soil fumigant the gels can be applied to the soil at a rate of 1 to 400 pounds per acre, e.g., The gel form 1,2-dibromoethane (ethylene dibromide) containing 10 percent polyethylene (0.916 density) when applied at a rate of 50 pounds per acre effectively controls the nematode meloidgyne.

Unless otherwise indicated all parts and percentages are by weight.

Example 1

An ethylene-vinyl acetate copolymer containing 40 percent by weight of vinyl acetate (18 mole percent) was dissolved in hot tetrahydro-furan and a methanolic solution of sodium methoxide was added to effect alcoholysis of the vinyl acetate moieties. After evolution of methyl acetate ceased, the mixture was cooled and the ethylenevinyl alcohol copolymer was precipitated in methanol and dried.

A solution of 1 gram of the polymer in 18 grams of ethylene dibromide was prepared by heating to 95° C. with stirring. On cooling, the solution formed a firm gel which was easily cut into cubes for handling and for application to the soil.

Example 2

The ethylene-vinyl alcohol copolymer prepared in Example 1 was placed in an autoclave with 18 times its weight of methyl bromide. The autoclave was sealed and heated to 90° C. After stirring 30 minutes the autoclave was cooled to room temperature and opened. A firm gel was obtained. The gel was readily subdivisable.

Example 3

Example 1 was repeated using an ethylene-vinyl acetate copolymer containing 28 weight percent vinyl acetate. After alcoholysis to form vinyl alcohol units, a 5 weight percent solution of the polymer in ethylene dibromide was prepared. On cooling, phase separation occurred, and the gel phase contained only 45 weight percent of the ethylene dibromide. This example illustrates the fact that the ratio of hydrophilic to hydrophobic groups is important.

Example 4

The hydrolyzed ethylene-vinyl acetate copolymer prepared in Example 2 was dissolved at a 5 weight percent level in ethylene dibromide, on cooling the solution set to a gel.

Example 5

Low density (0.918) polyethylene was dissolved at a 5 weight percent level in ethylene dibromide by heating to 100° C. On cooling some phase separation occurred. The liquid phase was removed by filtration leaving a firm gel containing 8 percent by weight polymer and 92 percent ethylene dibromide.

Example 6

In a glass vessel was placed 11 grams of styrene, 9 grams of hydroxyethyl methacrylate, 20 grams of Cellosolve acetate (ethyl ether of ethylene glycol monoacetate) and 0.05 grams of azo-bis-isobutyronitrile. The solution was heated at 80° C. for 6 hrs. The viscous solution was added to water to precipitate the polymer. After several water washes, the polymer was dried. A yield of 18 grams was obtained.

A 5 percent solution of the polymer was prepared in hot (80° C.) ethylene dibromide. On cooling a gel was formed.

Example 7

Example 7 was repeated using 7.5 grams of styrene and 10 grams of hydroxyethyl methacrylate. The polymer obtained at 82 percent conversion did not dissolve in hot ethylene dibromide. This example illustrates the importance of having sufficient hydrophobic groups present to insure gelation.

Example 8

Isotactic poly-n-butene-1 having a melt index of 0.3 was dissolved in ethylene dibromide at a 5 wt. percent level by warming to 70° C. On cooling, a stiff gel which was chopped into pellets was formed.

Example 9

The polymer of example 8 was placed in a stirred autoclave along with 18 times its weight of methyl bromide. The autoclave was sealed and heated to 75° C. with stirring. After 15 minutes, the autoclave was cooled to room temperature and opened. A stiff gel of desirable properties was obtained.

What is claimed is:

1. A gel suitable for use as a soil-fumigant consisting essentially of a liquid soil fumigant which is a haloaliphatic hydrocarbon wherein the halogen has an atomic weight of 35 to 80 and a polymer having a balance of hydrophilic and hydrophobic groups such that the hydrophobic portion of the polymer is present in sufficient quantity to maintain the polymer in a homogeneously dispersed condition throughout the fumigant and the hydrophilic groups, capable of hydrogen bonding, are substantially insoluble at a temperature not over ambient temperature and effect physical interchange attraction sufficient to cause gel formation, wherein the soil fumigant is 50 to 95 percent by weight of the total of soil fumigant and polymer.

2. The gel according to claim 1 wherein the polymer is selected from the group consisting of copolymers of a member selected from the group consisting of ethylene, styrene, alkyl acrylates, alkyl methacrylates and vinyl acetate with up to 50 percent of a hydrophilic group containing monomer.

3. The gel according to claim 1 wherein the polymer is polymer (1) and the polymer is one which has been prepared by polymerizing 11 grams of styrene, 9 grams of hydroxyethyl methacrylate, in 20 grams of ethyl ether of ethylene glycol monoacetate in the presence of 0.05 gram of azo-bisisobutyronitrile at 80°C. for 6 hrs. followed by precipitation of the polymer by the addition of water and drying, said gel containing 5 percent of said dried polymer and the balance ethylene dibromide.

4. The gel according to claim 2 wherein the soil fumigant is selected from the group consisting of ethylene dibromide and methyl bromide.

5. A gel suitable for use as a soil fumigant consisting essentially of a liquid soil fumigant which is a haloaliphatic hydrocarbon wherein the halogen has an atomic weight of 35 to 80 and a partially crystalline copolymer of ethylene with 0.1 to 20 percent of vinyl acetate, in which the noncrystalline portions of the molecule are sufficiently soluble in the fumigant to maintain the polymer dispersed throughout the liquid, and the crystallizable portions of the polymer are chain associated to form a network producing a gel structure, wherein the soil fumigant is 50–95 percent by weight of the total of soil fumigant and polymer.

6. The gel according to claim 5 wherein the soil fumigant is ethylene dibromide or methyl bromide.

7. A process of preparing the gel of claim 3 comprising making a 5 percent solution of the dried polymer in ethylene dibromide at 80°C. and cooling until a gel is formed.

8. Soil having applied thereto the soil fumigant and polymer gel of claim 1.

9. A process of fumigating soil comprising applying to the soil a fumigatingly effective amount of the gel of claim 1.

* * * * *